No. 722,800. PATENTED MAR. 17, 1903.
A. BOLZANI.
FRICTION CLUTCH.
APPLICATION FILED JUNE 23, 1902.
NO MODEL.

Witnesses:
Geo. E. Poulton
Walter Allen

Inventor.
Anton Bolzani.
by Herbert W. T. Jenner.
Attorney.

UNITED STATES PATENT OFFICE.

ANTON BOLZANI, OF BERLIN, GERMANY.

FRICTION-CLUTCH.

SPECIFICATION forming part of Letters Patent No. 722,800, dated March 17, 1903.

Application filed June 23, 1902. Serial No. 112,901. (No model.)

*To all whom it may concern:*

Be it known that I, ANTON BOLZANI, a citizen of the German Empire, residing at Colony Grunewald, Berlin, in the Kingdom of Prussia, Germany, have invented certain new and useful Improvements in or Relating to Friction-Clutches Particularly Adapted for Hoisting and Like Apparatus; and I do hereby declare the following to be a full, clear, and exact description of the invention, such as will enable others skilled in the art to which it appertains to make and use the same.

The present invention relates to improvements in or relating to friction-clutches particularly adapted for hoisting and like apparatus.

In friction brakes or clutches for lifts and hoists as hitherto used the driving part of the apparatus (hand-wheel, crank, pinion, motor, &c.) is generally influenced by the return or dropping of the load. If a brake is not capable of stopping the load, the latter moves downward or drops if the driving mechanism or the driving-motor is actually influenced by its motion, and therefore is not able to offer a sufficient resistance to the return or falling motion of the load.

In the present construction upon the selection of proper proportions the load and the driving mechanism are separately controlled by equal brake devices without a connection of both parts, which in a compulsory manner causes the rotation. If a motion of the driving device is not desired, the load cannot, if the present construction is properly carried out, automatically move downward, so that the present construction must be considered as a considerable progress.

Figure 1:
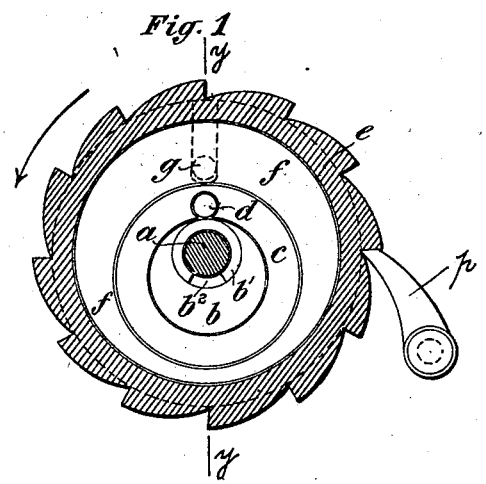
Figure 2:
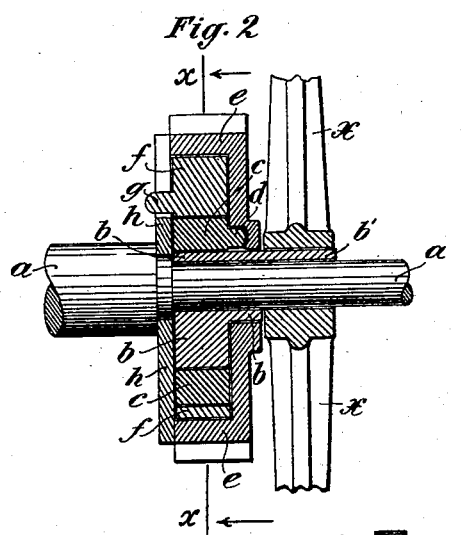
Figure 3:
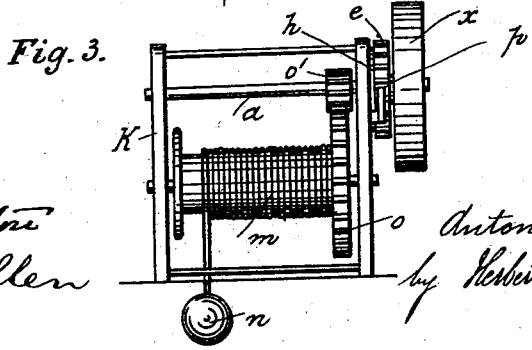

In the drawings, Figure 1 is a cross-section through the ratchet-wheel of the brake mechanism, taken on the line $x\ x$ in Fig. 2. Fig. 2 is a section through the brake mechanism, taken on the line $y\ y$ in Fig. 1. Fig. 3 is a side view of a winch having this brake mechanism applied to it and drawn to a smaller scale.

As shown in the drawings, an eccentric $b$, rigidly connected to a driving device $x$, is mounted on the shaft $a$ to be driven. The driving-wheel $x$ is secured to the eccentric $b$ in any approved manner. In the construction shown the collar $b'$ has a slot $b^2$ in one side of it, as shown in Fig. 1, and the hub of the wheel $x$ has a projection which enters this slot and which operates as a key to secure the wheel rigidly to the eccentric. Around this eccentric is a ring $c$, which engages, by means of a pin $d$, with a corresponding hole in a ratchet-wheel $e$, whereby it is coupled to the latter. The cylindrical hollow or flanged ratchet-wheel $e$ is loosely mounted, with its hub concentric to the shaft $a$, upon a concentric collar $b'$ of the eccentric $b$. Loosely fitted on the ring $c$ is an eccentric ring $f$, which fills up the hollow space remaining between ring $c$ and the inner circumference of the ratchet-wheel $e$ after arranging about the shaft $a$ the eccentric $b$ and the ring $c$. The opening of the ring $f$ is therefore also eccentric, according to the eccentricity of the eccentric $b$. The ring $f$ cannot turn upon the shaft $a$, but is so connected with the latter that it can alter its position with regard to the central axis as shown, for instance, in the drawings by means of a pin $g$, which enters a slot in a disk $h$, rigidly mounted upon the shaft $a$. The hollow ratchet-wheel $e$ is held against rotation in one direction by a pawl $p$ or the like.

The shaft $a$ may be the handle-shaft or the driving-pulley shaft of a winch K of any approved construction, of which $m$ is the barrel, $n$ is the load, $o$ is the toothed wheel on the barrel-shaft, and $o'$ the toothed pinion on the shaft $a$.

The operation of the device is as follows: When upon raising the load the driving device is set in motion, first of all the eccentric $b$, loosely mounted upon the shaft $a$ and coupled with the driving device, is turned and presses the ring $c$, coupled with the ratchet-wheel $e$ by means of the pin $d$, in frictional engagement with the ring $f$, coupled to the shaft $a$, and therefore causes the ring $f$ with its outer circumference to bind against the inner circumference of the ratchet-wheel $e$, and therefore the eccentric ring $f$, coupled with the latter, cannot immediately partake in the motion because of the weight of the load. As soon as the friction produced by the coöperation of these parts has become so strong as to overcome the resistance of the load the latter will be raised. The load will stop at any desired point upon stopping the driving device as the pawl engages with the ratchet-wheel $e$, and the latter prevents the friction-ring $c$, coupled with the ratchet-wheel by the pin $d$, from moving backward, the ring $f$, coupled with the shaft $a$, being pressed between $e$ and $c$, and the eccentric $b$, being of such eccentricity as to be independent of the action of the load, (it being isolated through ring $c$,) is compressed between the ring $c$ and the axial bore of the ratchet-wheel $e$. The effort of the load maintains the clutch in action until the driving device or the eccentric $b$ is moved by another force in the direction of the sinking load, and therefore the friction-clutch becomes slightly released. Consequently the load moves with the shaft $a$, together with the eccentric ring $f$ coupled to the latter by the disk $h$, in the opposite direction to the raising of the load. On stopping the driving device and its action upon the shaft $a$ the eccentric ring $f$ becomes forced or wedged between the ring $c$ and the inner circumference of the ratchet-wheel $e$. In this way the load is brought to a standstill, since, on the one hand, the ratchet-wheel $e$ and the ring $c$, coupled with the latter, cannot partake in the rotation of the ring $f$, owing to their being prevented from doing so by the pawl engaging with the teeth of the ratchet-wheel $e$. On the other hand, the eccentric $b$ cannot partake in the rotation of the ring $f$, as it is clamped between the ring $c$ and the axial opening of the wheel $e$.

What I claim is—

1. In a friction-clutch, the combination, with a shaft, and a driving member secured thereon; of an inner eccentric journaled on the said shaft, a driving device secured to the said inner eccentric, a ring mounted on the said inner eccentric, an outer eccentric mounted on the said ring and operatively connected with the said driving member, a wheel mounted on the said outer eccentric and operatively connected with the said ring, and a stop which normally prevents the said wheel from revolving in one direction, substantially as set forth.

2. In a friction-clutch, the combination, with a shaft, and a driving member secured thereon and provided with a slot; of an inner eccentric journaled on the said shaft, a driving device secured to the said inner eccentric, a ring mounted on the said inner eccentric, an outer eccentric mounted on the said ring and provided with a lateral projection which engages with the slot of the said driving member, a ratchet-wheel mounted on the said outer eccentric and operatively connected with the said ring, and a stop-pawl which engages with the said ratchet-wheel, substantially as set forth.

3. A friction-clutch particularly adapted for hoisting and like devices comprising a driven shaft, an eccentric loosely mounted thereon, an annular ring on said eccentric, a second eccentric mounted on the ring and having a lateral stud engaging a radial slot in a disk fast on the shaft substantially as described.

In witness whereof I have hereunto set my hand in presence of two witnesses.

ANTON BOLZANI.

Witnesses:
HENRY HASPER,
WOLDEMAR HAUPT.